(12) United States Patent
Venios et al.

(10) Patent No.: US 8,463,466 B2
(45) Date of Patent: Jun. 11, 2013

(54) METHOD, APPARATUS OR SOFTWARE FOR CONTROLLING THE HEADING OF AN AIRCRAFT ON THE GROUND

(75) Inventors: Anthony Venios, Bristol (GB); Stephan Mongereau, Bristol (GB); Sanjiv Sharma, Bristol (GB); Gianluca Verzichelli, Bristol (GB); Andrew Hebborn, Bristol (GB); Xavier Guery, Bristol (GB)

(73) Assignee: Airbus Operations Limited, Bristol (GB)

( * ) Notice: Subject to any disclaimer, the term of this patent is extended or adjusted under 35 U.S.C. 154(b) by 1041 days.

(21) Appl. No.: 12/026,808

(22) Filed: Feb. 6, 2008

(65) Prior Publication Data

US 2008/0188998 A1    Aug. 7, 2008

(30) Foreign Application Priority Data

Feb. 7, 2007    (GB) .................................. 0702332.8

(51) Int. Cl.
| | |
|---|---|
| *G06F 17/00* | (2006.01) |
| *G05D 1/00* | (2006.01) |
| *G05D 1/02* | (2006.01) |
| *G01C 21/00* | (2006.01) |

(52) U.S. Cl.
USPC .............. 701/10; 701/11; 701/466; 244/76 R; 244/220

(58) Field of Classification Search
USPC ................. 701/1, 3, 11, 14–17, 200, 10, 400, 701/408, 409, 466, 467, 468; 340/945, 947; 244/75.1, 76 R, 183, 220
See application file for complete search history.

(56) References Cited

U.S. PATENT DOCUMENTS

| | | | |
|---|---|---|---|
| 4,482,961 A | 11/1984 | Kilner et al. | |
| 4,947,096 A * | 8/1990 | Snow | ............................ 318/586 |
| 4,972,321 A | 11/1990 | Kahler | |
| 5,446,666 A * | 8/1995 | Bauer | ............................... 701/4 |
| 6,722,610 B1 | 4/2004 | Rawdon et al. | |

FOREIGN PATENT DOCUMENTS

GB    1591271    6/1981

OTHER PUBLICATIONS

UK Search Report for Application No. GB0702332.8 dated May 4, 2007.

* cited by examiner

*Primary Examiner* — Thomas Tarcza
*Assistant Examiner* — Edward Pipala
(74) *Attorney, Agent, or Firm* — Lowe Hauptman Ham & Berner, LLP (57) ABSTRACT

A method, apparatus and software is disclosed for controlling the heading of an aircraft travelling on the ground in which veering is detected and compensatory steering commands generated so as to automatically maintain a reference heading.

39 Claims, 5 Drawing Sheets

METHOD, APPARATUS OR SOFTWARE FOR CONTROLLING THE HEADING OF AN AIRCRAFT ON THE GROUND

RELATED APPLICATIONS

The present application is based on, and claims priority from British Application Number 0702332.8 filed Feb. 7, 2007, the disclosure of which is hereby incorporated by reference herein in its entirety.

FIELD OF INVENTION

The present invention relates to a method, apparatus or software for controlling the heading of an aircraft on the ground.

BACKGROUND OF THE INVENTION

When an aircraft is travelling on the ground, the aircraft is subject to one or more forces, which will cause the aircraft to change heading or veer. In order to maintain a desired heading and to compensate for veering, it is necessary for a pilot or co-pilot to make regular use of steering mechanisms such as nose wheel steering. Veering may be caused by external factors such as cross winds or gusts, uneven runway or taxiway cambers and atmospheric conditions. Veering may also be caused by the setup of the aircraft, such as uneven engine thrusts, steering system misalignment, steering servo drift or uneven tyre pressures.

Maintaining or correcting the heading of an aircraft by means of the tiller, hand wheels or the rudder and thus leads to additional workloads for the pilot or co-pilot.

SUMMARY OF THE INVENTION

An embodiment of the invention provides a method for controlling the heading of an aircraft on the ground, the method comprising the steps of:
a) determining a reference heading as the current heading of an aircraft when input to the aircraft ground steering system meets a predetermined first activation condition;
b) monitoring the true heading of the aircraft so as to detect any deviation of the aircraft from the reference heading;
c) calculating a ground steering angle arranged to correct any the deviation and to cause the ground steering system of the aircraft to return the aircraft to the reference heading; and
d) applying the steering angle to the ground steering system.

Steps b) to d) may be repeated at predetermined time intervals. The first activation condition may be the input falling below a predetermined level of steering angle. The first activation condition may be one of a set of activation conditions, which must be satisfied prior to the reference heading being determined.

The set of activation conditions may comprise a second activation condition of the aircraft ground speed being below a predetermined threshold. The set of activation conditions may comprise a third activation condition of the aircraft longitudinal acceleration being below a predetermined threshold. The set of activation conditions may comprise a fourth activation condition of the heading control function being enabled. The set of activation conditions may comprise a fifth activation condition of the heading data from the navigation system of the aircraft being within a predetermined range of accuracy.

The steps may be performed only when the or all the activation conditions have been met for a predetermined time threshold. Processing of the steps may be aborted if a predetermined first deactivation condition is met. The first deactivation condition may be one of a set of deactivation conditions and if any of the deactivation conditions is satisfied the processing of the steps is aborted. The first deactivation condition may be the input to the aircraft ground steering system meeting a predetermined first deactivation condition. The processing of the steps may be aborted only when one or more of the deactivation conditions have been met for a predetermined second time threshold. The or each deactivation condition may be the converse of a respective activation condition.

The steering angle may be added to existing steering commands for the ground steering system. The steering angle may be inputted into a nose wheel control system loop.

Another embodiment provides apparatus for controlling the heading of an aircraft on the ground, the apparatus being operable to:
determine a reference heading as the current heading of an aircraft when input to the aircraft ground steering system meets a predetermined first activation condition;
monitor the true heading of the aircraft so as to detect any deviation of the aircraft from the reference heading;
calculate a ground steering angle arranged to correct any the deviation and to cause the ground steering system of the aircraft to return the aircraft to the reference heading; and
apply the steering angle to the ground steering system.

A further embodiment provides a program or a group of programs arranged to enable a programmable device or group of such devices to perform a method for controlling the heading of an aircraft on the ground, the method comprising the steps of:
a) determining a reference heading as the current heading of an aircraft when input to the aircraft ground steering system meets a predetermined first activation condition;
b) monitoring the true heading of the aircraft so as to detect any deviation of the aircraft from the reference heading;
c) calculating a ground steering angle arranged to correct any the deviation and to cause the ground steering system of the aircraft to return the aircraft to the reference heading; and
d) applying the steering angle to the ground steering system.

Another embodiment provides a program or a group of programs arranged to enable a programmable device or group of such devices to provide apparatus for controlling the heading of an aircraft on the ground, the apparatus being operable to:
determine a reference heading as the current heading of an aircraft when input to the aircraft ground steering system meets a predetermined first activation condition;
monitor the true heading of the aircraft so as to detect any deviation of the aircraft from the reference heading;
calculate a ground steering angle arranged to correct any the deviation and to cause the ground steering system of the aircraft to return the aircraft to the reference heading; and
apply the steering angle to the ground steering system.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
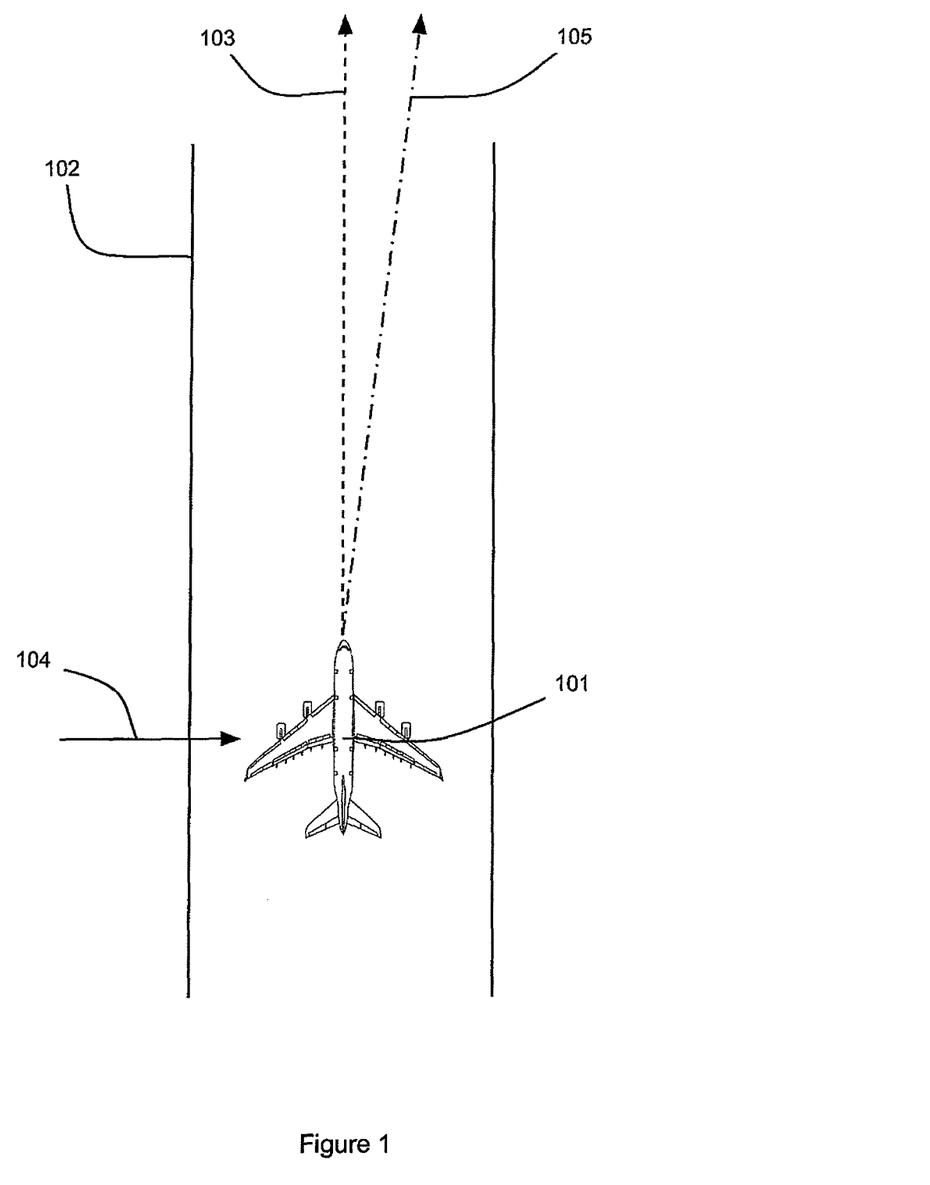
FIG. 1 is a plan view of an aircraft on the ground.

With reference to FIG. 1, an aircraft 101 travels on the ground 102 in the form of an airport taxiway. The aircraft 101 is set by the pilot to run on a first heading 103 selected so as to maintain the aircraft along the centreline of the taxiway 102. However, a side wind 104 acts laterally on the aircraft 101 causing the aircraft 101 to veer from the first heading 103. The resultant heading for the aircraft 101 is a second heading 105 which, if maintained, would cause the aircraft 101 to run off the side of the taxiway 102.

Figure 2:
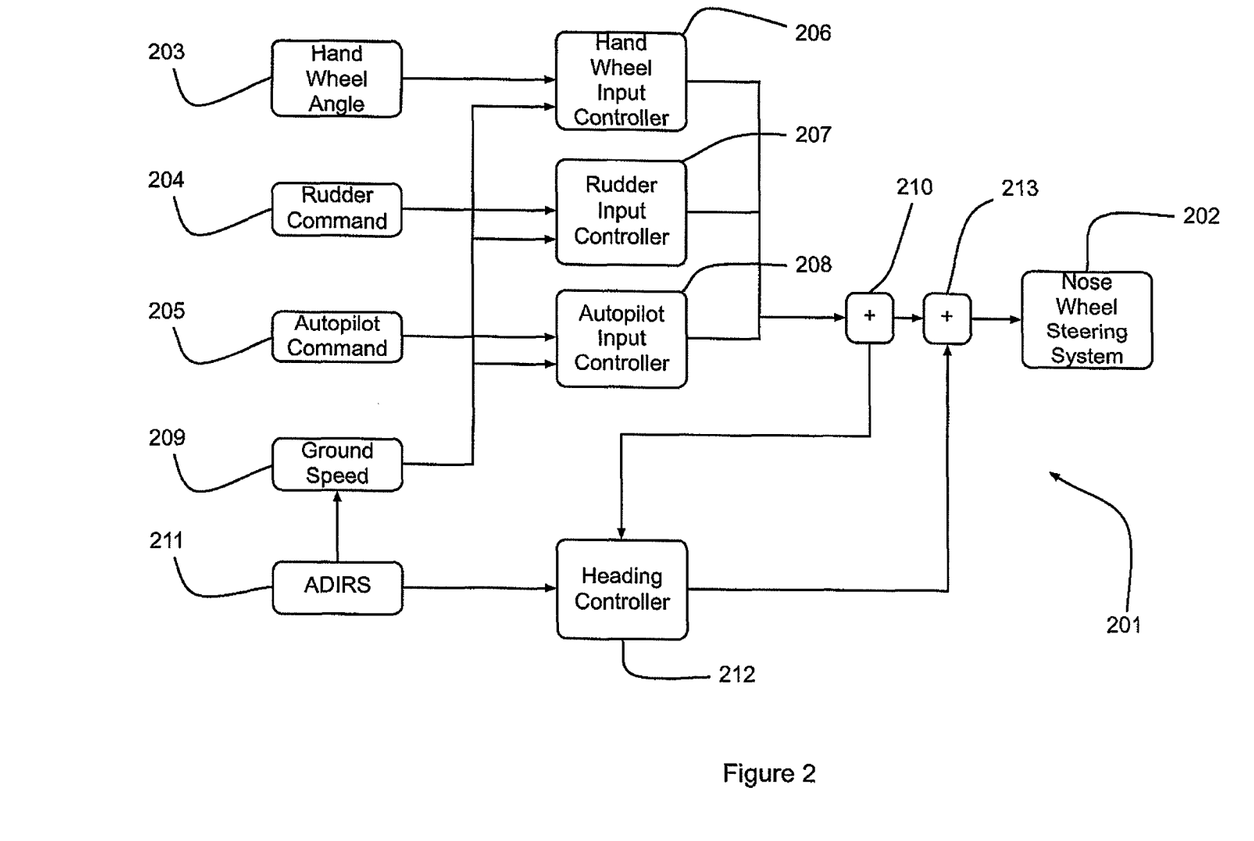
FIG. 2 is a schematic illustration of a steering system of the aircraft of FIG. 1.

With reference to FIG. 2, the aircraft 101 comprises an aircraft steering system 201, which takes inputs, in the form of steering control inputs, from the pilot and co-pilot and translates these inputs into commands for the aircraft ground steering system, in the form of a nose wheel steering system 202. The set of steering control inputs comprise hand wheel angles 203 received from the aircraft tiller or hand wheel, rudder commands 204 and autopilot commands 205. Each of the set of steering control inputs 203, 204, 205 feeds into respective controllers in the form of a hand wheel steering controller 206, a rudder input controller 207 and an autopilot input controller 208.

The aircraft ground speed 209, as measured by the aircraft navigation information system in the form of an Air Data Inertial Reference System (ADIRS) 211, is also input to each controller 206, 207, 208. Each of the controllers 206, 207, 208 is arranged to process their respective inputs 203, 204, 205 to produce a steering command for the nose wheel steering system 202. Each of the controllers 206, 207, 208 is arranged to modify the respective inputs 203, 204, 205 in accordance with a predefined respective function with respect to the ground speed 209. Each respective function is arranged to ensure that the steering command sent to the nose wheel steering system 202 is appropriate and within the operational bounds for the current operational conditions of the aircraft 101. The steering commands from each of the controllers 206, 207, 208 are algebraically added by an adder 210, to provide a first steering command for the nose wheel steering system 202.

The steering system 201 further comprises a heading controller 212, which is arranged to independently monitor the heading of the aircraft 101 and correct veering, within defined limits, from the first heading 103. Veering may be caused by external factors such as cross winds or gusts, uneven runway or taxiway cambers and atmospheric conditions. Veering may also be caused by the setup of the aircraft, such as uneven engine thrusts, steering system misalignment, steering servo drift or uneven tyre pressures. The heading controller 212 receives data from the ADIRS 211 in the form of the aircraft heading, speed and longitudinal acceleration. Using this data, the heading controller 212 calculates a second steering command arranged to correct any detected lateral drifting or veering. This second steering command is added into the nose wheel steering system loop by an adder 213 so that the sum of the first and second steering commands is provided to the nose wheel steering system 202.

Figure 3:
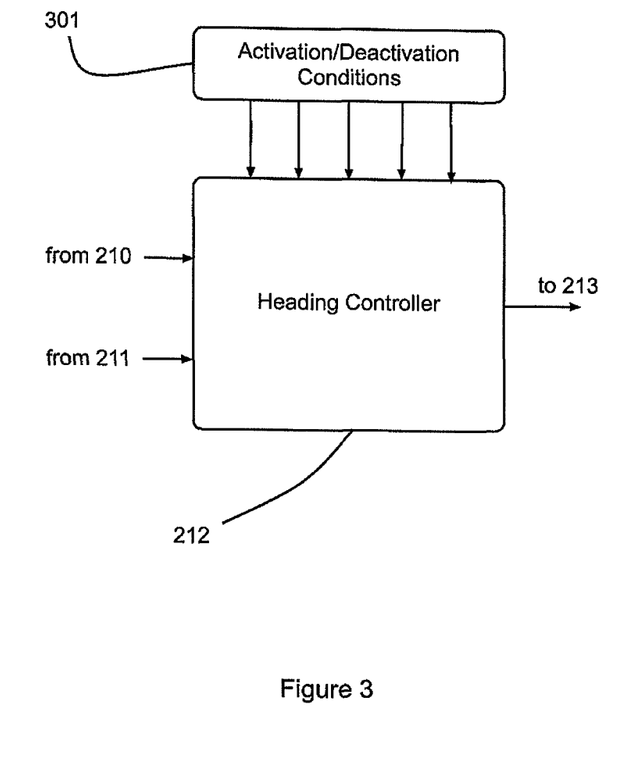
FIG. 3 is a schematic illustration of a heading controller in the steering system of FIG. 2.

With reference to FIG. 3, the heading controller 212 is arranged to operate only under a set of predetermined activation and deactivation conditions 301. In the present embodiment, the conditions 301 are set out in table 1 below:

TABLE 1

| Activation/Deactivation Condition | Activation Threshold | Deactivation Threshold |
|---|---|---|
| First steering command | <0.2 degrees | >=0.2 degrees |
| Aircraft ground speed | <50 knots | >=50 knots |
| Aircraft longitudinal acceleration | <0.2 g (m/s$^2$) | >=0.2 g (m/s$^2$) |
| ADIRS signal valid | yes | no |
| Heading controller enabled | yes | no |

The first activation condition is that the steering angle requested in the first steering command is less than 0.2 degrees. This may be treated as the primary activation condition as it is a trigger for the processing steps performed by the heading controller 212. When the first steering command drops below the threshold, this indicates that the pilot or co-pilot has set the aircraft on a desired heading. In response to this, the heading controller records the current heading as a reference heading and then monitors the subsequent headings of the aircraft 101. If and when the aircraft 101 veers or deviates from the reference heading, the heading controller 212 calculates the second steering command which it outputs to the adder 213 to be added to any first steering command and input to the nose wheel steering system 202. Thus the heading controller 212 is arranged to operate automatically to maintain any heading onto which the aircraft has been set. If, at any time, the first steering angle rises above the activation threshold, this indicates that the pilot or co-pilot is actively modifying the current heading of the aircraft 101 and thus, in accordance with the first deactivation condition, the heading controller 212 deactivates.

The second and third activation conditions, as shown in table 1 above, ensure that the heading controller is only operable under normal taxiing or ground travel conditions for the aircraft 101. That is, the heading controller 212 will only activate if the aircraft 101 is travelling below 50 knots with a longitudinal acceleration of less than 0.2 g. The first, second and third activation conditions are set at the specified levels to take into account the specific performance of the aircraft 101. The fourth activation condition ensures that the signal from the ADIRS 211 is valid, that is, the signals from the ADIRS 211 are being refreshed at an acceptable rate. The fifth activation condition ensures that the heading controller 212 has been manually enabled.

In the present embodiment, the deactivation conditions are the converse of the activation conditions. If, at any time during an active period of the heading controller 212 any deactivation condition becomes valid, the heading controller deactivates. In the present embodiment, in order for the heading controller 212 to be activated or deactivated, all of the respective conditions must be maintained for a predetermined time threshold of 0.2 seconds. The maximum second steering command produced by the heading controller 212 is limited to three degrees for the aircraft 101.

The algorithm used by the heading controller 212 to calculate the second steering command angle provides a Proportional Integrator Derivative (PID) control mechanism. The proportional (P) element is arranged to ensure that any veering is reduced, the derivative (D) element is arranged to ensure that the veering is corrected quickly and the integrator (I) element is arranged to ensure that the aircraft 101 goes back to the reference heading. The algorithm can be expressed as follows:

$$HCF\_Demand=(KVy \cdot K_P(V) \cdot Vy)+(KDy \cdot K_I(V) \cdot Dy)+(LPF(Kd,Td) \cdot K_D(V) \cdot Vy)$$

Where:

Vy is the lateral displacement speed: $Vy = V \cdot Sin(E)$, where E is the heading error, that is, the difference between the reference heading and the current heading;

Dy is the lateral displacement calculated by the integration of the speed Vy;

$K_P(V)$, $K_I(V)$ and $K_D(V)$ are functions of the speed V. In the present embodiment, $K_P(V)$ and $K_I(V)$ are linear and $K_D(V)$ is a constant;

LPF(Kd, Td) is a lead phase filter with tunable gain Kd and time constant Td. Both parameters allow adjustment of the phase advance value (0 to 90°) and the gain provided by the filter during the phase lead; and KVy and KDy are constant gains that allow dynamic adjustment of the algorithm tuning without modifying the $K_P(V)$, $K_I(V)$ and $K_D(V)$ functions.

The proportional element ensures that the output command is proportional to the error (Vy) input. Since KVy is a constant gain it can be modified on the aircraft if necessary. $K_P(V)$ is a gain that varies with speed and thus if the aircraft speed is constant this gain is constant. Due to the rolling dynamics of the aircraft, this gain must decrease with aircraft speed to avoid instability.

The integrator element ensures that the output command integrates the input error (Vy) to remove any static error. The static error is the amount of error between the reference heading and the current heading reached once the drift has been stopped by the proportional term. In terms of frequency response this term comprises a phase lag. As with the proportional element, KDy is a constant gain that can be modified in real time, and $K_I(V)$ is a gain that decreases with aircraft speed.

The derivative element uses a lead phase filter instead of a pure derivative term and provides a phase advance, when compared to the proportional element, to enable the algorithm to react more quickly to a variation of error. In other words, this element speeds up the dynamic response of the heading controller 212. A lead phase filter is less sensitive to noise than a derivative and is more tunable in terms of how much phase advance it provides.

Once the second steering command is computed by the heading controller 212, it is summed with the various hand wheel, rudder or autopilot steering commands by the adder 213 before being input to the nose wheel steering system 202. The global demand, in the form of the sum of the first and second steering commands is then translated into a steering angle through the NWS servo valve (not shown), which controls the flow to the steering actuators using the feedback from Rotary Variable Differential Transformers (RVDTs) (not shown). This correction ensures that the error between the actual aircraft heading and reference heading is eliminated and maintained at zero magnitude.

Figure 4:
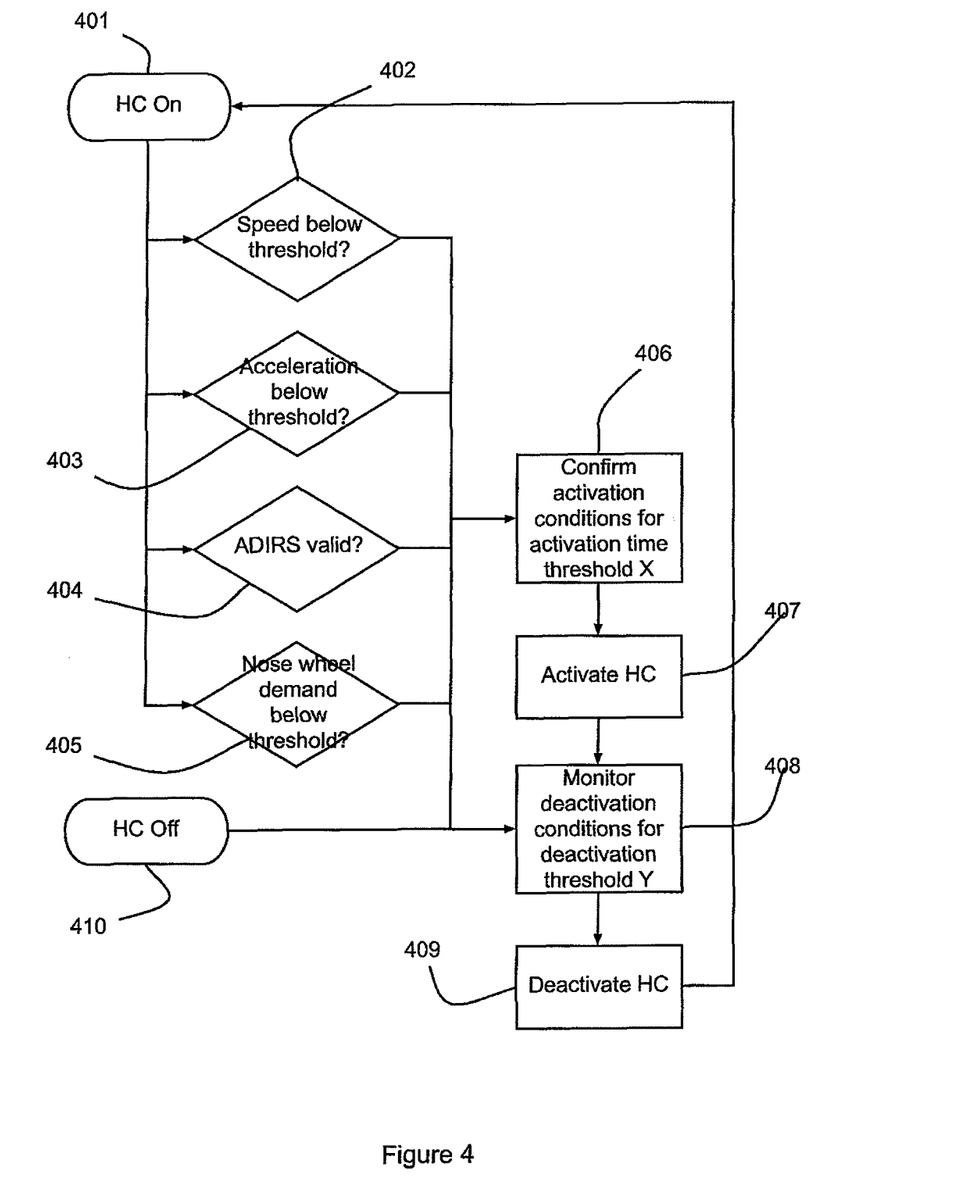
FIGS. 4 and 5 are flow charts illustrating processing carried out in the steering system of FIG. 2.

The processing carried out by the heading controller 202 when monitoring the activation and deactivation conditions 301 will now be described further with reference to FIG. 4. At step 401, the heading controller is enabled and processing moves simultaneously to steps 402, 403, 404 and 405 where the set of activation conditions 301 are monitored. At step 402, the aircraft speed is monitored from data provided by the ADIRS 211 and if and when it drops below the activation threshold of 50 knots, an indication is sent to step 406. At step 403, the aircraft acceleration is monitored from data provided by the ADIRS 211 and if and when it drops below the activation threshold of 0.2 g, an indication is sent to step 406. At step 404, the signals from the ADIRS 211 are monitored for validity and when they are determined as valid, an indication is sent to step 406. At step 405, the nose wheel demand, in the form of the first steering angle, is monitored and if and when it drops below the activation threshold an indication is sent to step 406.

At step 406, the indications from steps 402, 403, 404, and 405 are monitored and when all four indications determine that the activation conditions have been met for the activation time threshold of 0.2 seconds, processing moves to step 407. At step 407, the heading controller 212 is activated and beings processing as described in further detail below with reference to FIG. 5. With the heading controller 212 continuing in its active state, processing moves to step 408 where the inputs from steps 402, 403, 404, 405 are monitored for any one of the indications ceasing thus determining that one or more of the deactivations conditions have been met. In the present embodiment, since the activation conditions are the converse of the activation conditions, failing to meet an activation condition indicates that a deactivation condition has been met. In addition to the indications from steps 402, 403, 404, 405, a further step 410 provides input to step 408 indicating whether or not the heading controller has been manually disabled. If any one of the five deactivation conditions is met for the deactivation time threshold of 0.2 seconds, processing moves to step 409 where the heading controller is deactivated. Processing then returns to step 401 and proceeds as described above.

Figure 5:
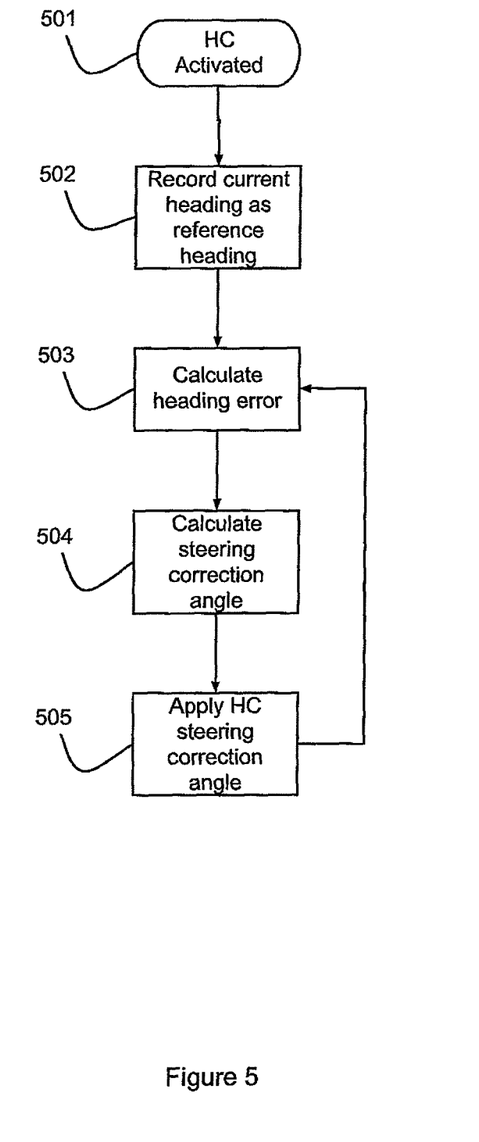

The processing carried out by the heading controller 202 in its active mode will now be described further with reference to the flowchart of FIG. 5. At step 501, the heading controller 212 is activated, by the processing described above with reference to FIG. 4. Processing then moves to step 502 where the current heading supplied by the ADIRS 211 is recorded as the reference heading for the aircraft that should be maintained. Processing then moves to step 503 where the current heading is monitored for any change between the current heading and the reference heading. As soon as any heading error is identified, processing moves to step 504. At step 504, the heading controller 212 calculates a steering correction angle, in the form of the second steering angle, in accordance with the algorithm described above. Processing then moves to step 505 where the second steering angle is issued and added to the first steering command before being input to the nose wheel steering system 202 as described above.

Processing then returns to step 503 to continue monitoring the current heading for the aircraft as described above.

As will be understood by those skilled in the art, the activation or deactivation conditions are dependent on the particular characteristics of a given aircraft and the expected operational envelope of that aircraft.

In another embodiment, the only activation condition is a manual switching mechanism that enables or disables the heading controller. In a further embodiment, the activation and deactivation time thresholds are different. In another embodiment, the sets of activation and deactivation conditions have one or more different values, that is, one set is not the converse of the other. In a further embodiment, the sets of activation and deactivation conditions are at least partly different sets of criteria.

In another embodiment, the steering mechanism is an alternative ground steering mechanism to nose wheel steering such as tail wheel or main landing gear steering. In a further embodiment, there may be no autopilot or rudder input to the heading controller.

In another embodiment, the ADIRS comprises three Air Data Inertial Reference Units (ADIRU). A voting system is implemented in which the two ADIRUs providing the closest data are selected and each data reading from these selected two is averaged to provide the data required for the heading controller.

The $K_P(V)$ and $K_I(V)$, and $K_D(V)$ are functions of aircraft speed and may be linear, constant or hyperbolic.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method of controlling the ground heading of a taxiing aircraft using an aircraft ground steering system, said method comprising the steps of:
    a) defining a first activation condition as a predetermined threshold of a first steering command input to said ground steering system of the aircraft;
    b) monitoring said first steering command input to said ground steering system for said first activation condition;
    c) if said first activation condition is met, storing the current heading of the aircraft as a reference heading;
    d) monitoring the true heading of said aircraft so as to detect deviation of said aircraft from said reference heading;
    e) calculating a ground steering angle arranged to correct any said deviation and to cause said ground steering system of said aircraft to return said aircraft to said reference heading;
    f) applying said ground steering angle in the form of a second steering command calculated by a heading controller to said ground steering system;
    adding said second steering command to said first steering command; and,
    steering said taxiing aircraft on the ground via a nose-wheel of said aircraft and in accordance with said added first and second steering commands.

2. A method according to claim 1, wherein steps d) to f) are repeated at predetermined time intervals.

3. A method according to claim 1, wherein
    said first activation condition is said first steering command falling below a predetermined level of steering angle; and
    said steps d) to f) are performed only when said first steering command is below said predetermined level of steering angle.

4. A method according to claim 1, wherein said steering commands are inputted into a nose wheel control system loop of the aircraft.

5. A storage containing a program or a group of programs arranged to enable a programmable device or group of such devices to perform the method of claim 1.

6. A method according to claim 1, wherein said first activation condition is said first steering command falling below a predetermined level of steering angle and is one of a set of activation conditions, all of which must be satisfied prior to said reference heading being determined.

7. A method according to claim 6, wherein said set of activation conditions further comprises a second activation condition of the aircraft ground speed being below a predetermined threshold.

8. A method according to claim 6, wherein said set of activation conditions further comprises a third activation condition of the aircraft longitudinal acceleration being below a predetermined threshold.

9. A method according to claim 6, wherein said set of activation conditions further comprises a fourth activation condition of a heading control function being enabled.

10. A method according to claim 6, wherein said set of activation conditions further comprises a fifth activation condition of heading data from a navigation system of the aircraft being within a predetermined range of accuracy.

11. A method according to claim 6, wherein said steps d) to f) are performed only when all said activation conditions have been met for a predetermined time threshold.

12. A method according to claim 6, wherein processing of said steps d) to 0 are aborted if a predetermined first deactivation condition is met.

13. A method according to claim 12, wherein said first deactivation condition is one of a set of deactivation conditions, and if any of said deactivation conditions is satisfied said processing of said d) to f) steps is aborted.

14. A method according to claim 12, wherein said first deactivation condition is an input into said ground steering system of the aircraft meeting a predetermined first deactivation threshold.

15. A method according to claim 12, wherein said processing of said d) to f) steps are aborted only when one or more of said deactivation conditions have been met for a predetermined second time threshold.

16. A method according to claim 12, wherein said or each deactivation condition is the converse of a respective said activation condition.

17. Apparatus for controlling the ground heading of a taxiing aircraft, said apparatus being configured to:
    define a first activation condition as a predetermined threshold of a first steering command input to a ground steering system of the aircraft;
    monitor said first steering command input to said aircraft ground steering system for said first activation condition;
    if said first activation condition is met, store the current heading of the aircraft as a reference heading;
    monitor the true heading of said aircraft so as to detect deviation of said aircraft from said reference heading;
    calculate a ground steering angle arranged to correct any said deviation and to cause said ground steering system of said aircraft to return said aircraft to said reference heading;
    apply said ground steering angle in the form of a second steering command to said ground steering system; and,
    wherein said second steering command is added to said first steering command for said ground steering system for steering said taxiing aircraft on the ground via a nose-wheel of said aircraft and in accordance with the added first and second steering commands.

18. Apparatus according to claim 17, wherein said apparatus is further configured to determine said true heading, monitor said true heading, calculate said ground steering angle and apply the calculated ground steering angle to said ground steering system at predetermined time intervals.

19. Apparatus according to claim 17, wherein
said first activation condition is said first steering command falling below a predetermined level of steering angle; and
said apparatus is further configured to determine said true heading, monitor said true heading, calculate said ground steering angle and apply the calculated ground steering angle to said ground steering system only when said first steering command is below said predetermined level of steering angle.

20. Apparatus according to claim 17, wherein said steering commands are inputted into a nose wheel control system loop of the aircraft.

21. A programmable device or group of such devices programmed by a program or a group of programs to provide the apparatus of claim 17.

22. Apparatus according to claim 17, wherein said first activation condition is said first steering command falling below a predetermined level of steering angle and is one of a set of activation conditions, all of which must be satisfied prior to said reference heading being determined.

23. Apparatus according to claim 22, wherein said set of activation conditions further comprises a second activation condition of the aircraft ground speed being below a predetermined threshold.

24. Apparatus according to claim 22, wherein said set of activation conditions further comprises a third activation condition of the aircraft longitudinal acceleration being below a predetermined threshold.

25. Apparatus according to claim 22, wherein said set of activation conditions further comprises a fourth activation condition of a heading control function being enabled.

26. Apparatus according to claim 22, wherein said set of activation conditions further comprises a fifth activation condition of heading data from a navigation system of the aircraft being within a predetermined range of accuracy.

27. Apparatus according to claim 22, wherein said ground steering angle is calculated only when all said activation conditions have been met for a predetermined time threshold.

28. Apparatus according to claim 22, wherein said calculation of said ground steering angle is aborted if a predetermined first deactivation condition is met.

29. Apparatus according to claim 28, wherein said first deactivation condition is one of a set of deactivation conditions and if any of said deactivation conditions is satisfied said calculation of said ground steering angle is aborted.

30. Apparatus according to claim 28, wherein said first deactivation condition is an input into the ground steering system meeting a predetermined first deactivation threshold.

31. Apparatus according to claim 28, wherein said calculation of said ground steering angle is aborted only when one or more of said deactivation conditions have been met for a predetermined second time threshold.

32. Apparatus according to claim 28, wherein said or each deactivation condition is the converse of a respective said activation condition.

33. A method of automatically controlling the ground heading of a taxiing aircraft using an aircraft ground steering system, said method comprising:
setting a steering demand threshold;
monitoring a user's manual steering demand input via a manual ground steering control to said aircraft ground steering system of the aircraft with respect to said predetermined steering demand threshold; and
if said user's manual steering demand input falls below said steering demand threshold, then automatically enabling the performance of the steps of:
a) setting the current heading of said aircraft as a reference heading;
b) monitoring the true heading of said aircraft so as to detect any deviation of said aircraft from said reference heading;
c) if a deviation of said aircraft from said reference heading is detected, then calculating a ground steering angle arranged to correct said deviation and to enable said ground steering system to return said aircraft to said reference heading; and
d) automatically applying said ground steering angle to said ground steering system for substantially maintaining said reference heading via a nose-wheel of said aircraft and in accordance with said ground steering angle automatically applied to said ground steering system.

34. A method according to claim 33, wherein said steering demand threshold is set at a level indicating no significant steering control demand from said user.

35. A method according to claim 34, wherein said ground steering system steers said aircraft exclusively via the nose-wheel of said aircraft and in accordance with the ground steering angle automatically applied to said ground steering system.

36. A method according to claim 34, further comprising:
if said user's manual steering demand input rises above said steering demand threshold, then disabling said automatic performance of steps a) to d).

37. A method according to claim 36, wherein said ground steering system steers said aircraft exclusively via the nose-wheel of said aircraft and in accordance with the ground steering angle automatically applied to said ground steering system.

38. A method according to claim 33, further comprising:
if said user's manual steering demand input rises above said steering demand threshold, then disabling said automatic performance of steps a) to d).

39. A method according to claim 38, wherein said ground steering system steers said aircraft exclusively via the nose-wheel of said aircraft and in accordance with the ground steering angle automatically applied to said ground steering system.

* * * * *